United States Patent [19]

Brunken et al.

[11] 4,280,118

[45] Jul. 21, 1981

[54] KEY-CONTROLLED ELECTROMAGNETIC OPERATING MECHANISM FOR A LOCK AND THE LIKE

[75] Inventors: Gerd Brunken, Dittelbrunn; Volker Eibl, Munich; Hans Fliege, Obertheres, all of Fed. Rep. of Germany

[73] Assignee: Sachs-Systemtechnik GmbH, Schweinfurt, Fed. Rep. of Germany

[21] Appl. No.: 103,728

[22] Filed: Dec. 14, 1979

Related U.S. Application Data

[63] Continuation of Ser. No. 963,275, Nov. 24, 1978, abandoned.

[30] Foreign Application Priority Data

Nov. 30, 1977 [DE] Fed. Rep. of Germany ....... 2753381

[51] Int. Cl.$^3$ ....................... H04Q 3/00; E05B 47/00; H01H 27/00; G08B 13/08

[52] U.S. Cl. ............................. 340/147 MD; 70/413; 200/44; 361/171

[58] Field of Search .............................. 361/170, 171; 340/164 R, 149 R, 147 MD; 70/413, 263; 200/44, 45

[56] References Cited

U.S. PATENT DOCUMENTS

| | | | |
|---|---|---|---|
| 3,512,382 | 5/1970 | Check et al. | 70/413 |
| 3,744,027 | 7/1973 | Vemura et al. | 340/147 MD |
| 3,854,120 | 12/1974 | Matto et al. | 340/164 R |
| 3,919,869 | 11/1975 | Fromm | 70/263 |

FOREIGN PATENT DOCUMENTS

| | | |
|---|---|---|
| 1032115 | 6/1966 | United Kingdom . |
| 1456138 | 11/1976 | United Kingdom . |
| 1459185 | 12/1976 | United Kingdom . |

*Primary Examiner*—Donald J. Yusko

*Attorney, Agent, or Firm*—Toren, McGeady and Stanger

[57] ABSTRACT

An operating mechanism for a lock and the like is operated by means of a key on which permanent magnets may be secured in available magnet positions of a fixed pattern of such positions, selected positions being occupied by magnets. A reading device includes a reader body and a guide for guiding the key into a predetermined position in which respective sensors are contiguously adjacent each available magnet position and respond to the presence of a magnet in the adjacent position by generating an electrical signal. The several signals are compared with a reference signal, and an operating signal is generated by a comparator connected to the sensors and to the source of the reference signal when the sensor signals agree with the reference signal.

12 Claims, 8 Drawing Figures

KEY-CONTROLLED ELECTROMAGNETIC OPERATING MECHANISM FOR A LOCK AND THE LIKE

This is a continuation of application Ser. No. 963,275, filed Nov. 24, 1978, now abandoned.

This invention relates to operating mechanisms for locks and the like, and particularly to a key-controlled electromagnetic operating mechanism.

It is known from U.S. Pat. No. 3,919,869 and from German Utility Model No. 7,612,488 to equip a key with magnets, to insert the key into a reading device in which sensors sense the presence of the magnets and produce signals indicative of the location of the magnets, and to operate a lock when the magnets are located in accordance with a code.

The known devices do not permit the magnet positions on the key and/or the code of the reading device to be changed readily. It is a primary object of this invention to provide a key and cooperating elements of an operating mechanism in which the magnet positions and preferably also the code may be changed readily.

With this object and others in view, as will present ly become apparent, the key of the operating mechanism of the invention is provided with securing devices which permit respective magnets to be secured releasably to portions of the key body which define a fixed pattern of available magnet positions on the key body. Permanent magnets are secured to the key body in selected available magnet positions, at least one of the positions being free of a magnet. The associated reading device includes a guide arrangement for guiding the key into a predetermined position relative to a reader body carrying sensors. The sensors are contiguously adjacent respective available magnet positions on the key body when the key is in the predetermined position and respond to the presence of a magnet in the adjacent available magnet position for generating an electrical signal. A comparator is connected to the sensors and to a source of a reference signal for comparing the sensor signals with a reference signal and for generating an operating signal in response to agreement of the sensor signals with the reference signal.

Other features, additional objects, and many of the attendant advantages of this invention will readily be appreciated as the same becomes better understood from the following detailed description of preferred embodiments when considered in connection with the appended drawing in which.

Figure 1:
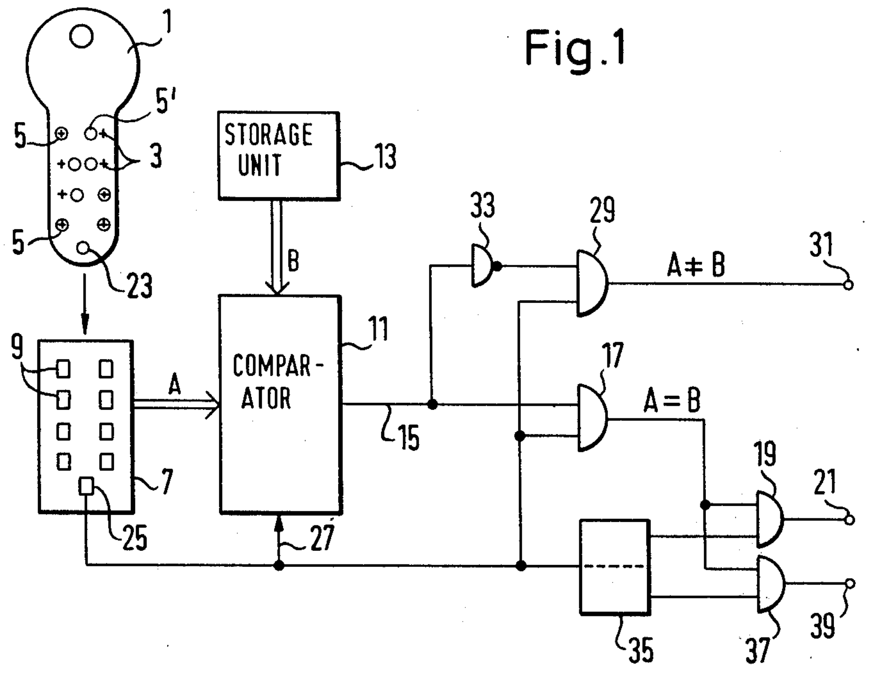
FIG. 1 shows the key, reader, and associated electric circuitry of a mechanism of the invention by conventional symbols.

Referring now to the drawing in detail, and initially to FIG. 1, there is shown a flat key 1 on which a pattern of eight available magnet positions 3 is indicated by crosses. Four of the positions are occupied by permanent magnets 5, represented by circles, and two magnets 5′ occupy rest positions spacedly adjacent two of the available magnet positions. Each magnet 5, 5′ may be shifted between an available position and a rest position, as will presently be described in more detail. An additional magnet 23 is fixedly mounted on the body of the key 1.

The key may be inserted into a reading device 7, as indicated by an arrow, and eight sensors 9 are located contiguously adjacent the available magnet positions 3 of the inserted key 1, the presence of the additional magnet 23 being sensed by a corresponding sensor 25. Each sensor 9, 25 is a Hull generator that responds to the presence of a magnet in its immediate vicinity by generating an electric signal.

The combined signals A of the sensors 9 are fed to one input of a comparator circuit 11 whose other input receives a code or reference signal B from a storage unit 13, such as a switching matrix which may be set relatively easily to produce various reference signals.A trigger input 27 of the comparator circuit 11 is connected to the sensor 25, and the comparator is kept in the activated condition as long as the magnet 23 is within range of the sensor 25.

The output signal of the comparator circuit produced when the signals A agree with the reference or code signal B is fed by a conductor 15 to one input of an AND gate 17 whose other input is connected to the sensor 25, and transmits the output signal of the comparator circuit 15 to respective first input terminals of AND gate circuits 19, 37. The second input terminals of the gate circuits 19, 37 are connected to respective output terminals of a flip-flop 35 which transmits the signal of the sensor 25 when the key 1 is inserted in the reader 7 to the AND gate circuit 19, and to the AND gate circuit 37 when the key 1 is being withdrawn so that corresponding output signals of the AND gate circuits 19, 37 are transmitted to the input terminals 21, 39 of an electrically operated lock, not otherwise shown. A signal at the terminal 21 causes the closed lock to open, a signal at the terminal 39 causes the open lock to shut.

Another AND gate 29 also receives the output signal of the comparator circuit 11 through an inverter 33 and the signal of the sensor 25 for transmitting an energizing signal to the terminal 31 of an alarm bell relay, not otherwise shown, when the signals A and B do not agree, thereby to indicate an attempt at opening the lock with an improper key.

Figure 2:
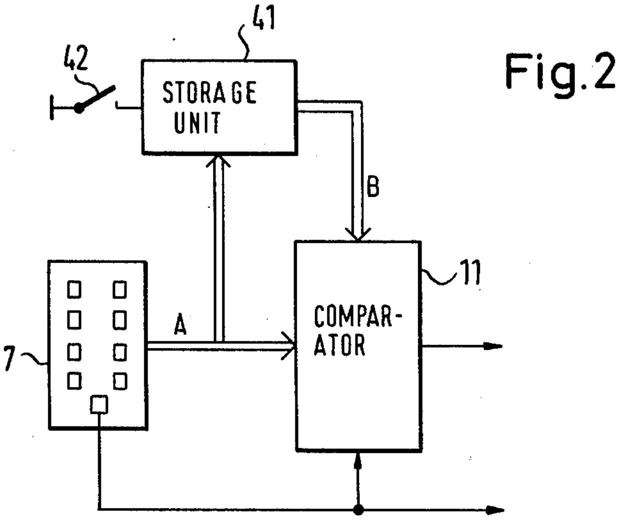
FIG. 2 shows a modified portion of the mechanism of FIG. 1 in a corresponding view.
Figure 3:
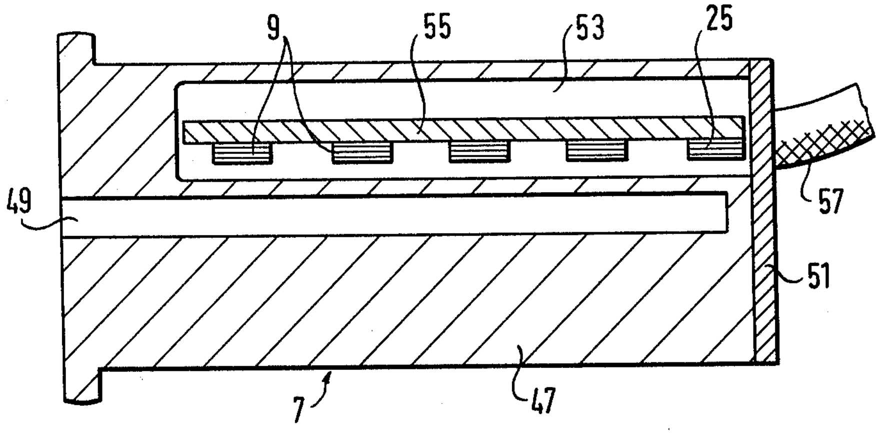
FIG. 3 shows the reader common to the devices of FIGS. 1 and 2 in side-elevational section.

In the modified mechanism shown in FIG. 2, and identical with that described with reference to FIG. 1 as far as not explicitly stated otherwise, the switching matrix 13 has been replaced by a magnetic core matrix 41 as a storage unit for a reference or code signal. A normally open push-button switch 42 permits the storage unit 41 to be switched temporarily from its normal writing mode into the reading mode. The unit 41 is conductively connected to the reading device 7 for receiving the signals of the sensors 9 in the reading device.

If it is desired to change the code or reference signal stored in the magnetic core matrix of the storage unit, a key carrying magnets in available magnet positions agreeing with the desired code or reference signal is inserted into the reading device 7 while the switch 42 is closed, thereby causing the unit 41 to read the signal A, and later to emit a corresponding reference signal when the key 42 is released. It will be appreciated that the key 42 is located in an area inaccessible unless the lock connected to the terminals 21, 39 is open.

Figure 5:
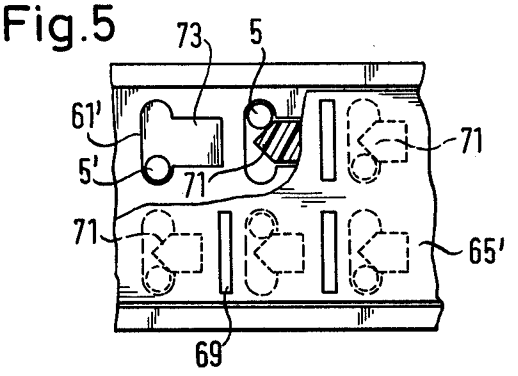
FIG. 5 is a fragmentary top plan view of a modification of the key of FIG. 4.

The reading device 7 is shown in more detail in FIG. 5. It has a body 47 of non-magnetic material formed with a guide slot 49 for the key 1 and with a chamber 53. A carrier plate 55 fixedly mounted in the chamber 53 in a conventional manner, not specifically shown, carries the eight Hull generators 9 and the Hull generator 25. Their output signal are transmitted to the comparator circuit 11 by a cable 57.

The key 1 has a flat, elongated, plastic body 59. One of the wide longitudinal faces of the key body 59 is recessed, and the bottom wall of the rectangular recess 67 is formed with eight grooves 61 elongated transversely to the direction of elongation of the recess 67 and arranged in two rows, a groove in each row being longitudinally aligned with a groove in the other row. A plastic cover plate 65 is guided in guide grooves 63 in the narrow, longitudinal walls of the recess 67 with enough longitudinal clearance to permit the cover plate 65 to be shifted manually between the illustrated position and a position in which eight slots 69 in the cover plate are aligned with respective grooves 61.

Figure 4:
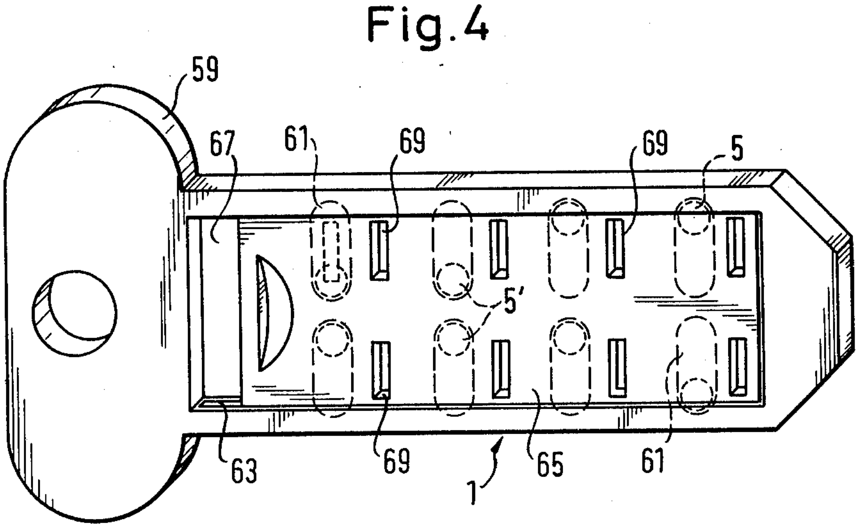
FIG. 4 is a perspective view of the key indicated in FIG. 1.

A spherical magnet 5, 5' is received in each groove 61, and the depth of the groove is such that the magnet is normally prevented from moving in the groove by frictional engagement with the somewhat resilient cover plate 65. When the slots 69 are aligned with the grooves 61, a thin nail or pin may be inserted through the slots to shift the magnets between a position adjacent a longitudinal edge of the key body 59 and another position adjacent the center of the recess 67. The magnets 5 adjacent the key edge are available to the sensors 9 when the key 1 is inserted into the guide slot 49 to the full depth of the slot so that the magnet 23, not itself visible in FIG. 4, is contiguously adjacent the sensor 25. When shifted into the rest position adjacent the center of the recess 67, the magnets 5' are out of range of the sensors associated with the same groove 61.

The modified key partly illustrated in FIG. 5 has a rectangular recess similar to the afore-described recess 67, and its bottom wall is formed with grooves 61' with the center portions of which respective rectangular chambers 73 communicate, leaving well defined pockets at the ends of each groove 61' for magnets 5 in an available position or magnets 5' in a rest position.

A cover plate 65', otherwise similar to the cover plate 65, carries eight integrally molded locking wedges 71. When the cover plate 65' moves longitudinally on the key body, the wedges move in the chambers 73 between the illustrated locking position in which they extend into the groove 61' and hold the magnets 5, 5' in their respective positions, and a retracted position in which they permit the magnets to be shifted by means of a tool inserted through access slots 69 in the cover plate 65'.

Figure 6:
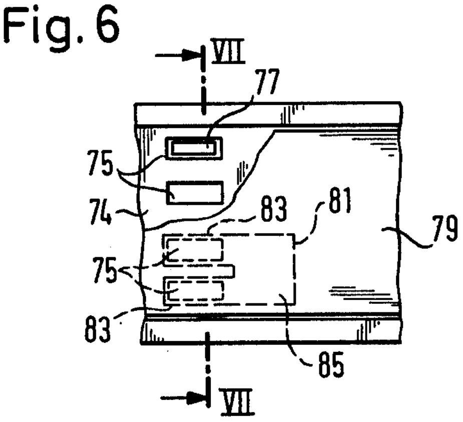
FIG. 6 shows a portion of another modified key in a view corresponding to that of FIG. 5.
Figure 7A:
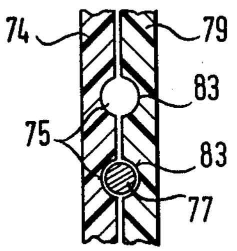
FIGS. 7*a* and 7*b* show a part of the key of FIG. 6 in section on the line VII—VII in two different operating conditions.
Figure 7B:
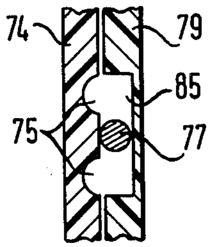

The further modified key shown in FIG. 6 in the manner of FIG. 5, and further in the sectional views of FIGS. 7*a* and 7*b*, has a rectangular recess whose bottom wall has four transverse rows of four parallel grooves 75 of semicircular cross section. A cover plate 79 which is guided slidably in the rectangular recess in a manner more fully shown in FIG. 4 covers the grooves 75 at all times. The face of the cover plate 79 directed toward the grooves 75 is formed with four rows of four grooves 83 of semicircular cross section corresponding to that of the grooves 75, but slightly longer than the grooves 75. Each pair of transversely juxtaposed grooves 83 merges into a chamber 85 of a length and depth sufficient to accept a cylindrical rod magnet 77 for free movement between two juxtaposed grooves 75 when the chamber 85 is aligned with the grooves 75.

The two outer grooves 75 define available magnet positions, the inner grooves define rest positions for rod magnets 77. In the position of the cover plate 79 illustrated in FIGS. 6 and 7*a*, each magnet 77 is conformingly confined in a groove 75 and an aligned groove 83. When the cover plate is moved toward the left from the position of FIG. 6 until a chamber 85 is aligned with each pair of grooves 75, as is shown in FIG. 7*b*, the magnets 77 are free to roll or slide between the two grooves 75.

The distribution of the magnets 77 between available magnet positions and rest positions in the key of FIG. 6 may be changed by sliding the cover plate 79 into the position of FIG. 7*b* and thereafter vigorously shaking the key before the cover plate 79 is returned to its locking position. When the key carrying its magnets in a concealed and actually unknown distribution is inserted into the reading device 7 in the circuit of FIG. 2, and the push button switch 42 is closed, the lock operating mechanism is being set for a code or reference number not known and not likely to be duplicated by another key of any one of the types shown in FIGS. 4 to 6. If so desired, the location of the reset magnets 77 may be ascertained by means of a magnetic compass or other conventional device, and additional keys of the types shown in FIGS. 4 and 5 may be set for the new code.

Hull generators have been employed heretofore as sensors for magnet-carrying keys, but other devices capable of generating an electric signal in response to the proximity of a magnet, such as contacts sealed in an evacuated glass tube on magnetic reeds (reed relays) and integrated circuits responsive to a magnetic field, may be substituted in an obvious manner.

The illustrated cover plates 65, 65', and 79 consist of opaque plastic and are permanently secured to the respective key bodies. If so desired, the cover plates may consist of transparent material or of a material sufficiently resilient to permit the cover plates to be flexed so that they may be withdrawn from the guide grooves 63. A transparent cover plate permits inspection, and a very flexible plate permits the total number of magnets in a key to be changed, as may sometimes be desirable.

It should be understood, therefore, that the foregoing disclosure relates only to presently preferred embodiments, and that it is intended to cover all changes and modifications of the examples of the invention herein chosen for the purpose of the disclosure which do not depart from the spirit and scope of the invention set forth in the appended claims.

What is claimed is:

1. A key-controlled, electromagnetic operating mechanism for a lock and the like comprising:

(a) a key including
  (1) a key body,
  (2) securing means for releasably securing respective magnets to portions of said key body, said portions defining a fixed pattern of available magnet positions on said key body;
(b) a plurality of magnets secured to said key body by said securing means in selected ones of said positions, at least one other position being free of a magnet;
(c) a reading device including
  (1) a reader body, (2) guide means for guiding said key body into a predetermined position relative to said reader body;

(d) a plurality of sensing means on said reader body, (1) said sensing means being contiguously adjacent respective available magnet positions on said key body when said key body is in said predetermined position, (2) each sensing means responding to the presence of a magnet in the adjacent magnet position for generating an electrical signal;

(e) a source of a reference signal;

(f) comparator means operatively connected to said sensing means and to said source for comparing the electrical signals generated by said sensing means with said reference signal and for generating an operating signal in response to agreement of said electrical signals with said reference signal.

2. A mechanism as set forth in claim 1, wherein said source includes storage means for storing said reference signal and means for varying the stored reference signal.

3. A mechanism as set forth in claim 2, wherein said source includes a switching matrix.

4. A mechanism as set forth in claim 1, further comprising means operatively connecting said sensing means to said source for varying said reference signal in response to said electrical signals until said agreement is reached.

5. A mechanism as set forth in claim 4, wherein said source includes a magnetic core matrix and means for switching said matrix between a writing mode and a reading mode.

6. A mechanism as set forth in claim 1, further comprising an additional magnet fixedly mounted on said key body, and additional sensing means on said reader body contiguously adjacent said additional magnet in said predetermined position of said key body, said additional sensing means being operatively connected to said comparator and responsive to the presence of the contiguously adjacent additional magnet for activating said comparator.

7. A mechanism as set forth in claim 1, wherein said securing means further define a fixed pattern of rest positions for said magnets on said key body, said rest positions being associated with said available magnet positions respectively, and said sensing means including means for securing magnets released from said available magnet positions in said rest positions, the key further including guide means on said key body for guiding each magnet between an available magnet position and the associated rest position, said sensing means being unable to respond to a magnet in the rest position when the associated available magnet position is adjacent the sensing means.

8. A mechanism as set forth in claim 7, wherein said key body is formed with a plurality of recesses constituting said guide means, each magnet being received in a corresponding one of said recesses for movement between the available magnet position and the rest position thereof, said securing means including a locking member associated with each recess and mounted on said key body for movement into and out of a portion of the associated recess intermediate said positions of a magnet received in said recess.

9. A mechanism as set forth in claim 8, wherein said securing means futher include a cover mounted on said key body for movement between two positions, said cover closing said recesses transversely to the direction of magnet movement and carrying the locking members associated with said recesses, the locking members moving into and out of the intermediate portions of the respective associated recesses when said cover moves between said two positions.

10. A mechanism as set forth in claim 9, wherein said cover is formed with a plurality of passages therethrough giving access to said recesses and to the magnets therein when said locking members are moved out of said intermediate portions.

11. A mechanism as set forth in claim 7, wherein said key body is formed with respective recesses in each of said available magnet positions and said rest positions, said recesses being each dimensioned for receiving one of said magnets, and said guide means include a slide formed with a channel therein and movable on said key body between a position in which said slide closes said recesses and a position in which said channel connects each recess in an available magnet position with the recess in the associated rest position.

12. A key comprising:

(a) a key body of non-magnetic material;

(b) a plurality of permanent magnets;

(c) securing means for releasably securing respective magnets to portions of said key body, (1) said portions defining a fixed first pattern of available magnet positions on said key body, (2) said securing means defining a fixed second pattern of rest positions for said magnets, (3) said rest positions being associated with respective available magnet positions, (4) said securing means including means for securing magnets released from said available magnet positions in said rest positions; and (d) guide means on said key body for guiding each magnet between an available magnet position and the associated rest position.

* * * * *